United States Patent
Ning

(10) Patent No.: US 6,856,465 B2
(45) Date of Patent: Feb. 15, 2005

(54) OPTICAL VIEWFINDER

(76) Inventor: Alex Ning, 2122 Sea Island Pl., San Marcos, CA (US) 92069

( * ) Notice: Subject to any disclaimer, the term of this patent is extended or adjusted under 35 U.S.C. 154(b) by 88 days.

(21) Appl. No.: 10/294,520

(22) Filed: Nov. 13, 2002

(65) Prior Publication Data

US 2004/0090680 A1 May 13, 2004

(51) Int. Cl.7 ............................. G02B 3/00; G03B 13/06
(52) U.S. Cl. ........................................ 359/642; 396/382
(58) Field of Search ................................. 396/296, 373, 396/377, 382; 359/473, 479, 642, 811

(56) References Cited

U.S. PATENT DOCUMENTS

| | | | | |
|---|---|---|---|---|
| 5,561,538 A | * | 10/1996 | Kato et al. ..................... 349/5 |
| 5,625,372 A | * | 4/1997 | Hildebrand et al. ............ 345/8 |
| 5,664,244 A | * | 9/1997 | Yamamura et al. .......... 396/296 |
| 6,473,238 B1 | * | 10/2002 | Daniell ........................ 359/622 |

* cited by examiner

*Primary Examiner*—Ricky Mack
(74) *Attorney, Agent, or Firm*—James F. Kirk

(57) ABSTRACT

A optical viewfinder has a single viewfinder element formed from a homogenous material such as glass or plastic. The viewfinder element has an object surface and an image surface. The object and image surfaces are centered on a common optical axis. The object surface has a periphery extending to a first clear aperture, CA1. The image surface has a periphery extending to a second clear aperture, CA2. A reticle is formed on the object surface. The reticle is centered on the optical axis. A micro-lens is formed on the image surface and is centered on the optical axis. The micro-lens has a periphery extending to a third clear aperture, CA3 inside of the diameter of the second clear aperture.

16 Claims, 4 Drawing Sheets

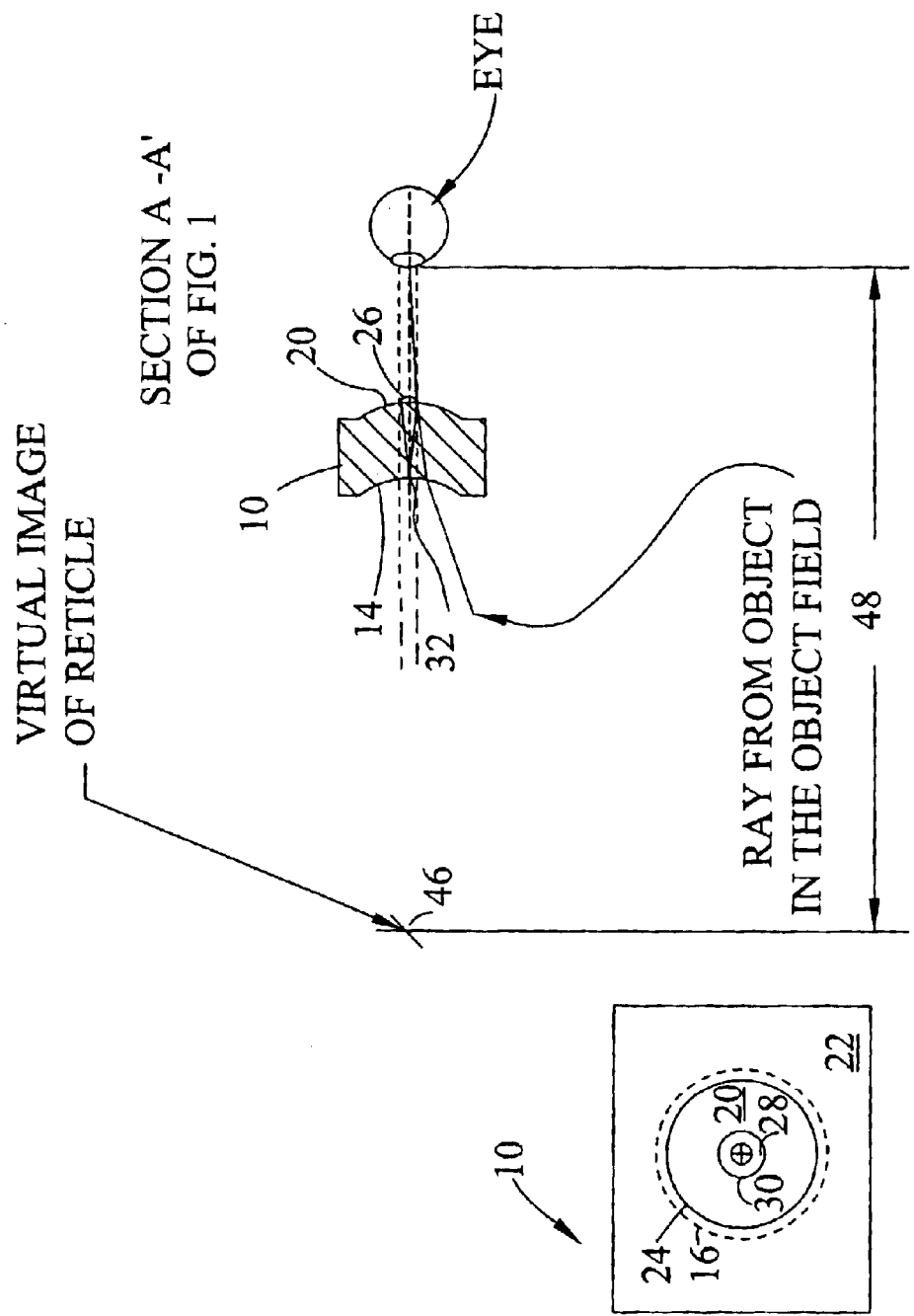

OPTICAL VIEWFINDER

BACKGROUND OF THE INVENTION

1. Field of the Invention

An optical viewfinder is commonly seen on both film and digital cameras. The viewfinder assists the operator of a camera in pointing and framing an object to be focused on the image plane of a digital CCD or CMOS sensor for digital processing. Digital cameras, cell phones cameras or small imaging devices that requiring short profiles are possible examples of applications in which the subject invention can be employed.

2. Description of Related Art

Conventional viewfinders have at least two separate lens elements (such as the Galilean type) with appropriate spacing between the elements. There are several significant problems with existing viewfinders. The first problem is that the overall length of existing viewfinders makes them unsuitable for compact cameras such as the ones used in PDA and cell phones. The second problem is that it is costly and difficult to provide a reticle for aiming purpose with existing two element viewfinders. A multi-element viewfinder with one or more optical elements may also include one or more prisms. The lens material, the number of lenses, the prescription for each lens or prism element and the distance at which each lens element is positioned along the optical axis in front of the viewing port establishes the thickness and contributes to the cost of the viewfinder.

BRIEF SUMMARY OF THE INVENTION

New portable imaging devices, such as digital cell phone cameras have emerged and gained popularity. The need to produce a thin, inexpensive, compact size viewfinder element has increased, along with the need to provide a thin image module capable of capturing an image on the image plane of a CCD or CMOS imager such as the Kodak KAC-1310.

An object of this invention is to create a viewfinder element that has a very thin profile and inexpensive to produce. The viewfinder element solves the problem by the use of a single viewfinder element formed from a homogenous material such as plastic or glass.

A second object of this invention is to create a viewfinder element which includes a reticle feature that allows better aiming of the camera during picture taken.

The viewfinder element is prescribed to have an object surface and an image surface. The object and image surfaces are centered on a common optical axis. The object surface has a periphery extending to a first clear aperture, CA1. The image surface has a periphery extending to a second clear aperture, CA2. A reticle is formed on the object surface. The reticle is centered on the optical axis. A micro-lens is formed on the image surface and centered on the optical axis. The micro-lens has a periphery that extends to a third clear aperture.

BRIEF DESCRIPTION OF THE SEVERAL VIEWS OF THE DRAWINGS

FIG. 3 is a schematic rear view of the viewfinder element;

FIG. 4 is a schematic side sectional view of the viewfinder element taken on section line A–A' of FIG. 1 depicting the function of each surface and an eye;

DETAILED DESCRIPTION OF THE INVENTION

Figures 1, 2:
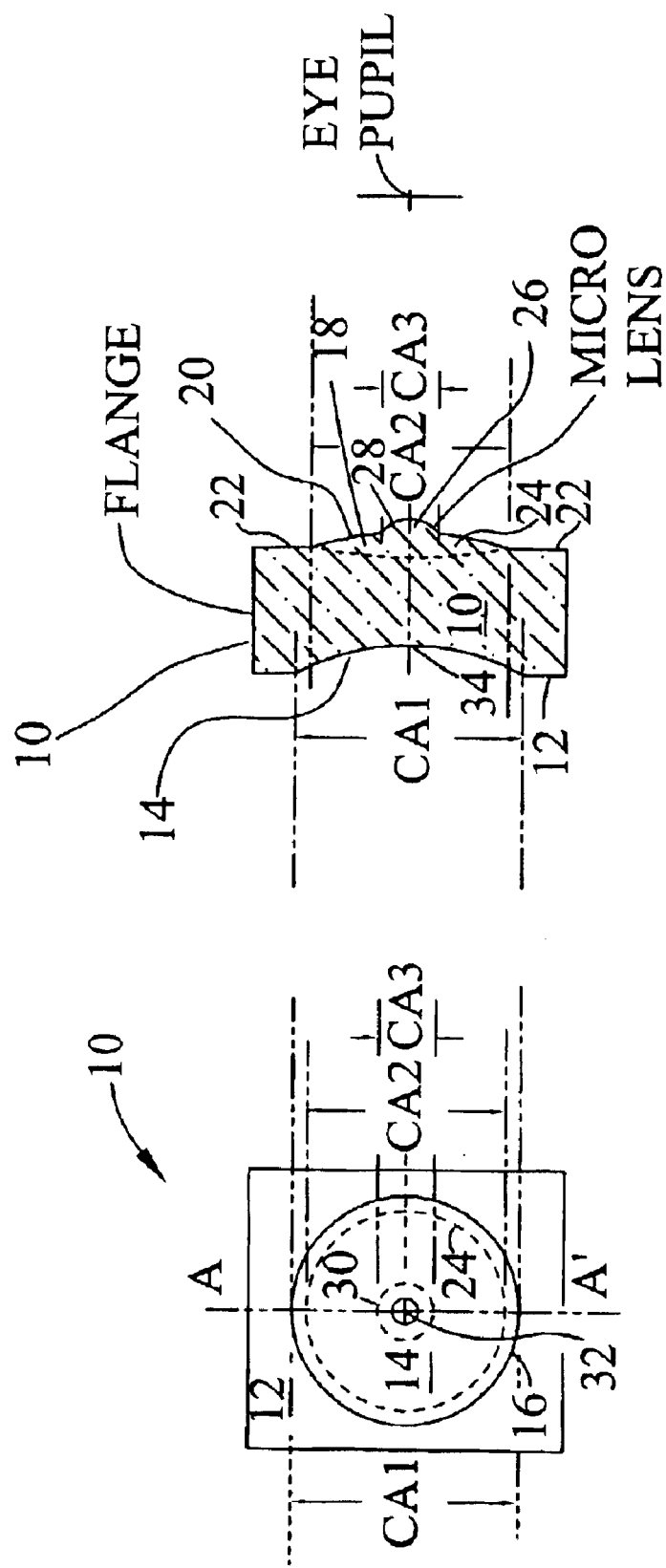
FIG. 1 is a schematic front view of the viewfinder element.
FIG. 2 is a schematic side sectional view of the viewfinder element of FIG. 1, taken on section line A–A'.

FIG. 1 is a front surface view of the viewfinder element 10. The front surface 12 of the viewfinder 10 has a concave lens surface referred to herein as an object surface 14, formed as a recess in the front surface 12 of the viewfinder element 10. The object surface 14 faces the object field to be viewed by the viewfinder element 10. The object surface 14 has a periphery or border shown as circle 16 that extends to and defines a first clear aperture CA1.

FIG. 2 is a schematic sectional drawing of the viewfinder element 10 taken on section line A–A' of FIG. 1. Referring to both FIGS. 1 and 2, image lens 18, having a convex lens surface, referred to herein as image surface 20 is formed on the rear surface 22 of the viewfinder element 10. FIGS. 1 and 2 show flange surfaces 23a–23d located between the object and image surfaces. The flange surfaces 23a–23d are used for mounting the viewfinder element 10 to a camera or cell phone housing. The image surface 20 is co-axially positioned behind the object surface 14.

The image surface 20 has a periphery, or border, shown in FIG. 1 as phantom circle 24 that extends to and defines a second clear aperture identified as CA2. A micro-lens 26, having a convex lens surface, referred to herein as a micro-lens surface 28 is formed on the image surface 20 of image lens 18. The micro-lens surface 28 is the third lens surface in sequence, beginning with the object surface 14. The micro-lens surface 28 has a periphery or border, shown in FIG. 1 as a small phantom circle 30, that extends to and defines a third clear aperture CA3.

A reticle 32 is shown as a cross within a circle in FIG. 1 at the center of the object surface 14. The viewfinder element 10 has an optical axis 34, shown in FIG. 2, that is normal to the plane of FIG. 1 as it passes through the center of the reticle 32, the center of the object surface 14, and then through the center of micro-lens surface 28. It should be understood that the relative diameter of micro-lens 26 is exaggerated in the Figures. The reticle 32 is formed on the center of front surface or object surface 14. A typical reticle 32 is shaped to form a "cross", a "ring", a "post" or one of many other well known shapes. The marker can be printed, molded or formed on the object surface by other means as part of the front surface.

The function of each surface is depicted in FIG. 4. The optical viewfinder belongs to a class of optical instruments known as afocal devices. Afocal devices have a near infinity focal length (zero optical power). However, they do provide an angular magnification or de-magnification. Other well-known afocal devices are telescopes, microscopes and periscopes. A light ray from an object is refracted by the object surface first and which is again refracted by the image surface. The object surface (which has negative power) and image surfaces (which has positive power) are arranged such that the net optical power of the element excluding the micro-lens area should be within the accommodation range of the human eye. The optical power should therefore be 0 or close to 0 diopter for most applications. The overall magnification is determined by the ratio of the object surface power to the image surface power. For optical viewfinders, the magnification ratio is less than 1. In order to minimize optical aberrations inherent in the surfaces, aspheric surfaces that can minimize the optical aberrations should be considered. Optical design programs should be used to determine the optimal surface properties for each given configuration.

A micro-lens is provided to form a virtual image of the reticle at a distance in front of the object surface. This positively powered micro-lens is located near or at the center of the rear surface. The power of this micro-lens is such that its focal point is near surface of the marker. With this arrangement, the marker is magnified and projected to a location in front of the user's eye forming a virtual image at a distance which allows for comfortable viewing. The viewer perceives a virtual image of the reticle 32 at a virtual image of reticle distance 48 in FIG. 4. The clear aperture of the micro-lens should be substantially smaller than the diameter of the user's pupil. The clear aperture might be about a millimeter in diameter. This will allow the user to view both the object and the aiming marker at the same time.

The following is provided by way of example and is not intended to be limiting. FIGS. 1–3 show a lens arrangement of lens surfaces consistent with the present invention and the following example for the purpose of illustration. The front surface, or object surface 14, is a simple spherical surface with a radius of 10 mm while the rear surface or the image surface is an aspheric surface. The micro-lens has a clear aperture of 1 mm with a radius of 1.72 mm. The center thickness of the lens is 5 mm. The reticle 32 is a simple "cross" that is either molded or painted on the object surface 14.

Surface Data Summary

| Surface | Radius | Thickness | Material | Conic Constant |
|---------|--------|-----------|----------|----------------|
| Object | −10.00 | 5.00 | PMMA | 0 |
| Image | −12.03 | | | 0.96 |
| Micro-lens | 1.72 | | | 0.42 |

In this example, the viewfinder element 10 is formed from optical material, such as PMMA (acrylic). The front or object surface 14 has a radius of 10 mm (concave). The thickness of the element is 5 mm. The front or object surface 14 has a clear aperture, CA1, or diameter of 7.7 mm.

The image surface 20, the near surface, has a radius of −12.02809 mm convex with a conic constant of 0.9602523. The rear or image surface 20 has clear aperture CA2 or diameter of 7.35502 mm The micro-lens surface 28 radius is −1.72 mm convex and a conic constant of 0.4221555 with a clear aperture, CA3, or diameter of 1 mm.

Possible parameter ranges of practical interest:

The front or object surface 14 can have a radius with a range of from −2.5 to infinity (Surface power from 0 to 400 diopter). The near or image surface 20 could have a radius of from −2.5 to infinity. (Surface power from 0 to 400 diopter). The viewfinder element thickness can be in the range of from 1 mm to 25 mm. The micro-lens clear aperture, CA3, can be in a range of from 0.1 mm to 5 mm. Any optical grade material can be used for the viewfinder element 10.

The viewfinder element 10 is typically made using injection molding. A precision mold is prepared that produces the required prescriptions on each of the three lens surfaces. The resulting product is formed as a single homogenous optical grade plastic product. The object lens surface 14, the convex image lens 18 and the micro-lens 26 are formed as integral and homogenous components in the injection mold as the viewfinder element 10 is formed. Once the mold is perfected, a high volume of identical viewfinder elements can be molded with identical optical characteristics at very low cost.

Figure 5:
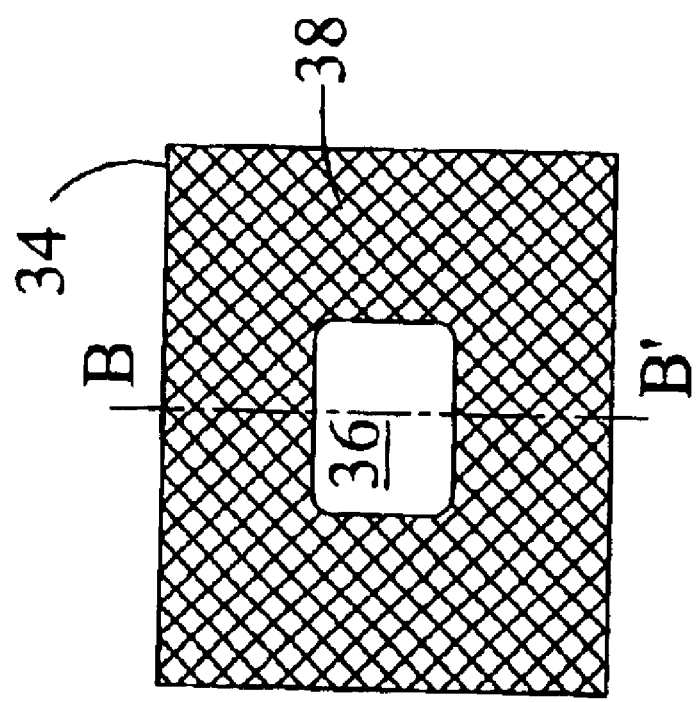
FIG. 5 is a schematic front view of a framing window.

FIG. 5 is a frontal view of a framing window 35. The framing window 35 has a clear or sight window 36 and an opaque or frosted border region 38. In a preferred embodiment, a framed window is positioned in front of this viewfinder element 10 to provide a traditional rectangular field and appearance.

A framing window has no optical power and can be made of any optically clear material with sufficient optical quality. The opaque or frosted border region 38 can be a blackened frame or border that defines the rectangular appearance of the image field.

Figure 6:
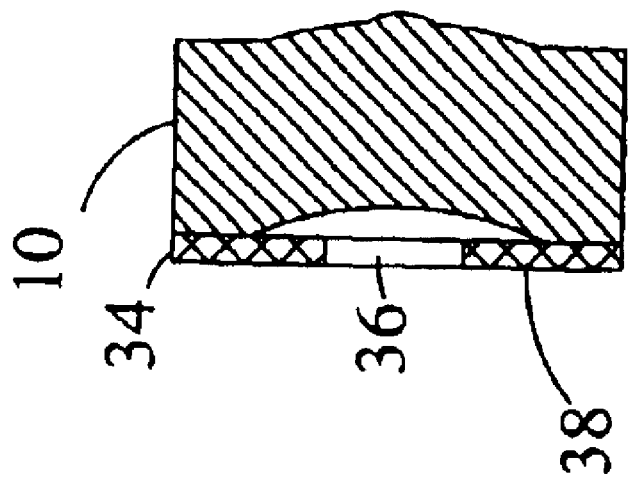
FIG. 6 is a schematic sectional view of the viewfinder element of FIG. 1, taken on section line A–A' showing the sectional view of the framing window of FIG. 5 taken on section line B–B' positioned on the viewfinder element.

FIG. 6 is a schematic sectional view of the framing window 35 of FIG. 5 taken on section line B–B' attached to the front surface 12 of the viewfinder element 10. The sectioned sight window 36 and the sectioned opaque or frosted border region 38 appear with the back surface of the frosted border region being bonded to the front surface 12 of the viewfinder element 10.

Figure 7:
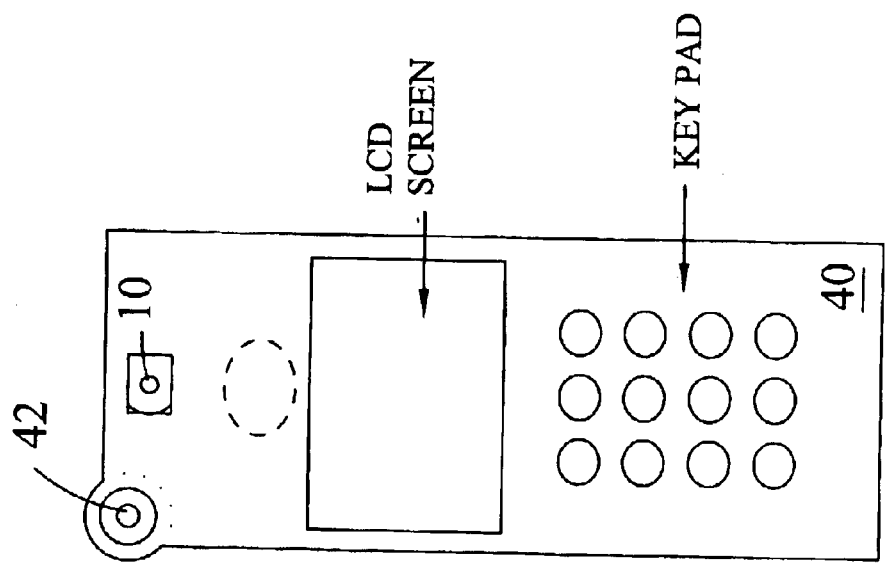
FIG. 7 is a schematic front view of a cell phone showing the location of the viewfinder element and the position of the imager module in the phone.

FIG. 7 is a schematic front view of a handheld device such as a cell phone having an imager module 42 and a viewfinder element 10. The viewfinder element 10 has a first or object surface 14 formed as a concave lens surface in the body of the viewfinder element 10. Referring again to FIGS. 1 and 2 along with FIG. 7, such hand held devices using the viewfinder element 10 have an image lens 18 with a convex image surface 20 is formed on the side of the viewfinder element 10 that is opposite the object lens surface 14. The object and image surfaces are centered on a common optical axis 34. The object surface has a periphery that extends to a first clear aperture CA1 and the image surface has a periphery extending to a second clear aperture CA2. The object surface has a reticle formed on the object surface centered on the optical axis.

Figure 8:
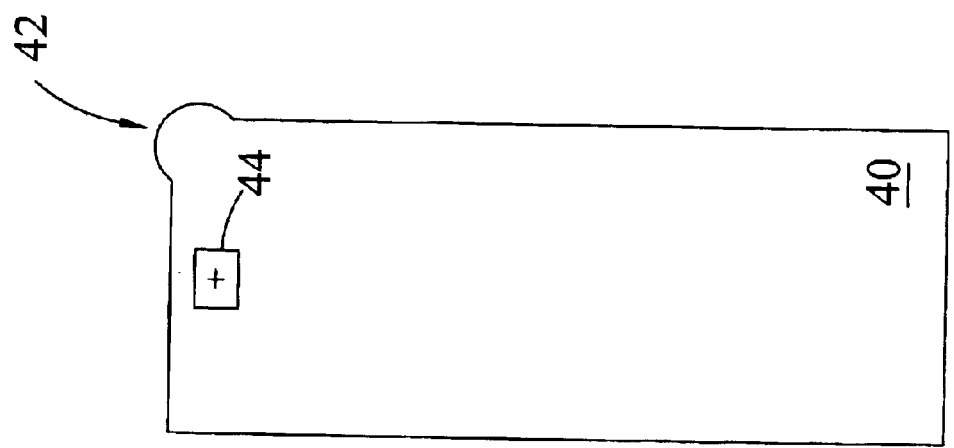
FIG. 8 is a schematic rear view of a cell phone showing the location of the viewfinder element view port in the phone.

FIG. 8 is a schematic rear view of the handheld device 40 of FIG. 7. The sight window 36 of the viewfinder element 10 is centered in a viewing port at the top of the device case. The case as shown is shaped to contain an imager module 42.

Those skilled in the art will appreciate that various adaptations and modifications of the preferred embodiments can be configured without departing from the scope and spirit of the invention. It is to be understood that the invention may be practiced other than as specifically described herein, within the scope of the appended claims.

What is claimed is:

1. A viewfinder comprising:
   a viewfinder element having
   an object surface with a negative optical power,
   an image surface with a compensating positive optical power a reticle formed on the surface of the object surface centered on an optical axis, a micro-lens formed on the image surface having a positive optical power characterized to amplify the image of the reticle, the prescription of the micro-lens being adjusted to obtain an enlarged virtual image of the reticle at a predetermined distance in front of the viewfinder.

2. The viewfinder element of claim 1 wherein the viewfinder element is formed from a single piece of optical material.

3. The viewfinder element of claim 1 further comprising a framing window coupled to the viewfinder element object surface to define a clear window within the first clear aperture, the clear window having an opaque border.

4. The viewfinder element of claim 1 wherein the viewfinder element has a flange surface between the object and image surfaces for mounting the viewfinder element to a camera or cell phone housing.

5. The viewfinder element of claim 1 wherein the viewfinder element further comprises the prescription of the following table:

| Surface | Radius | Thickness | Material | Conic Constant |
|---------|--------|-----------|----------|----------------|
| Object | −10.00 | 5.00 | PMMA | 0 |
| Image | −12.03 | | | 0.96 |
| Micro-lens | 1.72 | | | 0.42. |

6. A digital imaging device having an electronic imager and a viewfinder, the viewfinder comprising:
a viewfinder element having
an object surface lens with a negative optical power,
an image surface with a compensating positive optical power,
a reticle formed on the surface of the object surface centered on an optical axis,
a micro-lens formed on the image surface having a positive optical power characterized to amplify the image of the reticle, the prescription of the micro-lens being adjusted to obtain an enlarged virtual image of the reticle at a predetermined distance in front of the viewfinder.

7. The viewfinder element of claim 6 wherein the viewfinder element is formed from a single piece of optical material.

8. The viewfinder element of claim 6 further comprising a framing window coupled to the viewfinder element object surface to define a clear window within the first clear aperature, the clear window having an opaque border.

9. The viewfinder element of claim 6 wherein the viewfinder element is formed from a single piece of optical material and wherein the viewfinder element is mechanically coupled to a digital imaging sensor to enable accurate pointing and capturing of an image.

10. The viewfinder element of claim 6 wherein the viewfinder element further comprises the prescription of the following table:

| Surface | Radius | Thickness | Material | Conic Constant |
|---------|--------|-----------|----------|----------------|
| Object | −10.00 | 5.00 | PMMA | 0 |
| Image | −12.03 | | | 0.96 |
| Micro-lens | 1.72 | | | 0.42. |

11. A viewfinder element comprising:

a viewfinder element having an object surface and an image surface, the object and image surfaces being centered on a common optical axis, the object surface having a periphery extending to a defining first clear aperture, the image surface having a periphery extending to a second clear aperture, a reticle is formed on the viewfinder object surface, the reticle being centered on the optical axis, a micro-lens is formed on the viewfinder image surface and centered on the common optical axis, the micro-lens having a periphery extending to a third clear aperture within the second clear aperture.

12. The viewfinder element of claim 11 wherein the viewfinder element is formed from a single piece of optical plastic.

13. The viewfinder element of claim 11 further comprising a framing window coupled to the viewfinder element object surface to define a clear window within the first clear aperture, the clear window having a frosted border.

14. The viewfinder element of claim 11 wherein the viewfinder element has a flange surface between the object and image surfaces for mounting the viewfinder element to a camera or cell phone.

15. The viewfinder element of claim 11 wherein the prescription of the viewfinder element including the object surface, the image surface and the micro-lens are characterized to form the image of the reticle at a position in space beyond the object surface.

16. The viewfinder element of claim 11 wherein the viewfinder element further comprises the prescription of the following table:

| Surface | Radius | Thickness | Material | Conic Constant |
|---------|--------|-----------|----------|----------------|
| Object | −10.00 | 5.00 | PMMA | 0 |
| Image | −12.03 | | | 0.96 |
| Micro-lens | 1.72 | | | 0.42. |

* * * * *